(12) United States Patent
Wade et al.

(10) Patent No.: US 6,298,731 B1
(45) Date of Patent: Oct. 9, 2001

(54) COMBINATION PRESSURE SENSOR AND REGULATOR FOR DIRECT INJECTION ENGINE FUEL SYSTEM

(75) Inventors: Richard A. Wade; Paul P. M. Beuger, both of Shelby, NC (US)

(73) Assignee: Fasco Controls Corporation, Shelby, NC (US)

( * ) Notice: Subject to any disclaimer, the term of this patent is extended or adjusted under 35 U.S.C. 154(b) by 0 days.

(21) Appl. No.: 09/376,823

(22) Filed: Aug. 18, 1999

(51) Int. Cl.$^7$ .................................................. G01L 7/00
(52) U.S. Cl. ................................................. 73/756; 73/1.72
(58) Field of Search .................................... 73/119 A, 714, 73/756, 1.71, 1.72; 123/305, 425, 435

(56) References Cited

U.S. PATENT DOCUMENTS

| | | |
|---|---|---|
| 5,186,138 | 2/1993 | Hashimoto .................. 123/198 DB |
| 5,222,481 | 6/1993 | Morikawa ........................ 123/435 |
| 5,341,994 | 8/1994 | Wakeman ...................... 239/585.5 |
| 5,718,203 | 2/1998 | Shimada et al. ................. 123/425 |
| 5,805,466 | 9/1998 | Roeckner et al. ............... 364/558 |
| 5,881,694 | 3/1999 | Nakada ........................... 123/305 |

*Primary Examiner*—William Oen
(74) *Attorney, Agent, or Firm*—John M. England, Jr.; Terrence (Terry) Martin; Jules Jay Morris

(57) ABSTRACT

A pressure regulating device for high pressure fuel systems includes a pressure sensing element attached directly to a pressure chamber. The pressure sensing element includes a semiconductor element that deflects in response to a deflection of a portion of the pressure caused by fuel pressure within the pressure chamber. A coil is electrically connected with the pressure sensing element and is configured to generate a magnetic field that moves a magnetic armature to control fuel pressure.

24 Claims, 7 Drawing Sheets

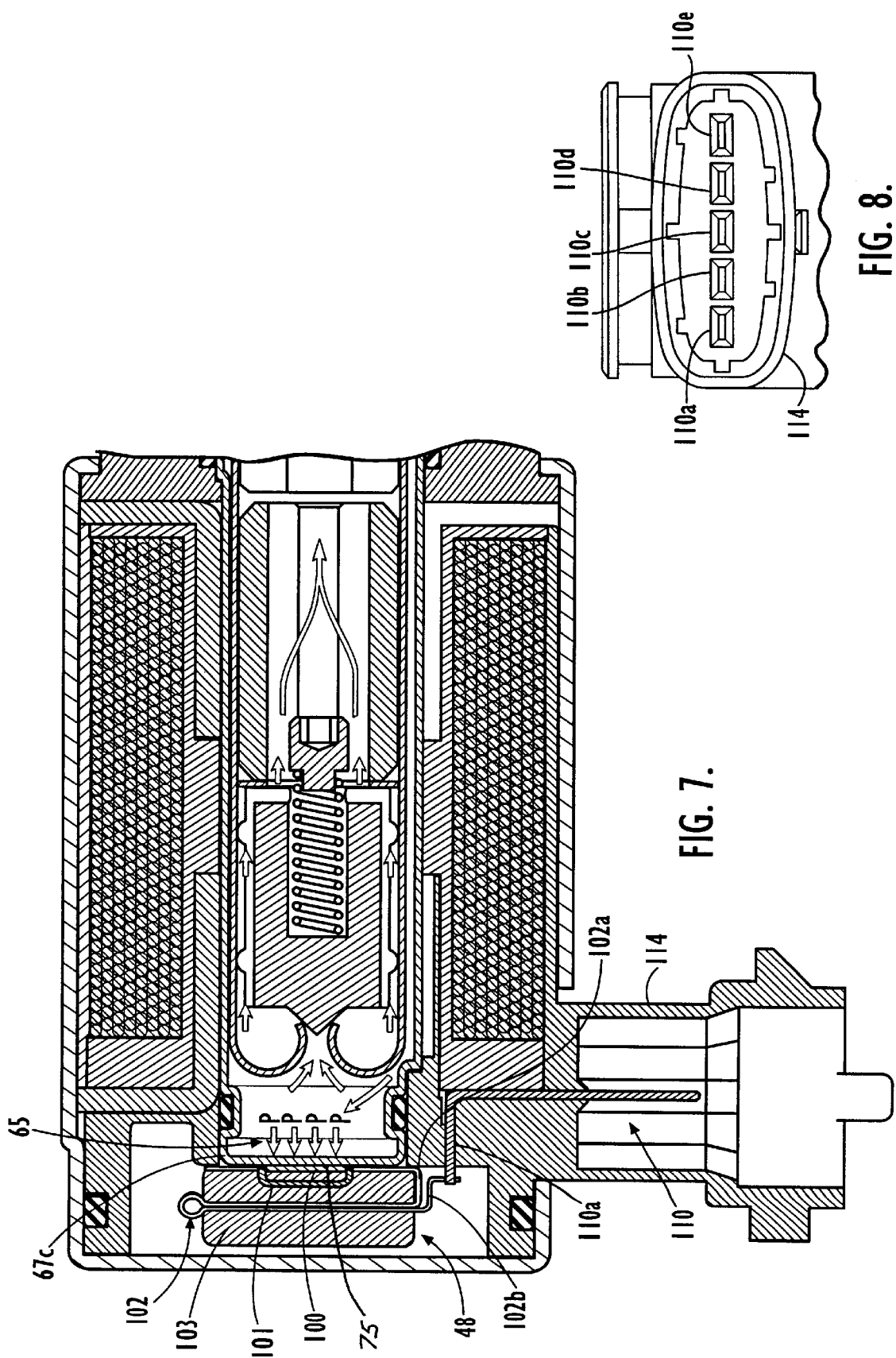

COMBINATION PRESSURE SENSOR AND REGULATOR FOR DIRECT INJECTION ENGINE FUEL SYSTEM

FIELD OF THE INVENTION

The present invention relates generally to pressure regulating devices and, more particularly, to pressure regulating devices for fuel systems.

BACKGROUND OF THE INVENTION

To help meet consumer demand for more fuel efficient vehicles, automotive companies have begun investigating the use of direct injection fuel systems for internal combustion engines. In a direct injection fuel system, a fuel injector injects highly pressurized fuel directly into an engine cylinder combustion chamber during the compression stroke. Direct fuel injection can facilitate efficient fuel combustion, thereby improving fuel economy.

Because fuel is injected during a compression stroke, the fuel must be at a high pressure (e.g., about 200 Bar or 2,900 psi) in order to enter the cylinder. High fuel pressure is typically achieved by using a high-pressure booster pump in conjunction with a low pressure fuel tank pump.

FIG. 1 is a schematic illustration of a conventional direct injection fuel system 5 for an internal combustion engine. Fuel, such as gasoline, is pumped from a tank 10 via a low pressure tank pump 12 to a high pressure booster pump 14. The high pressure booster pump 14 raises the pressure of the fuel so that the fuel can enter a combustion chamber against the compression pressure in the cylinder. Typically, a high pressure booster pump is mounted to an engine and is operated directly from a cam (or crank) shaft within the engine. As illustrated in FIG. 1, the high pressure fuel discharged from the high pressure booster pump 14 flows through a fuel rail 42 and to each injector 18 via a respective fuel passageway 20. Each injector 18 is configured to deliver a controlled amount of fuel into a respective cylinder 22 when activated by an engine control unit (ECU) 24. Conventionally, fuel pressure in a fuel rail 42 is controlled via a fuel rail pressure regulator 26 and a fuel rail pressure sensor 28. Typically, the pressure sensor 28 and pressure regulator 26 communicate with each other via an ECU 24.

Because two separate components (i.e., a pressure regulator and a pressure sensor) are typically used to control fuel pressure in conventional direct injection fuel systems, multiple connections in a fuel rail are typically necessary. Unfortunately, each connection in a high pressure fuel rail is a potential source of fuel leakage. Because fuel rails are typically mounted near hot exhaust manifolds, the potential for fire caused by a fuel leak from a high pressure fuel rail can be substantial.

SUMMARY OF THE INVENTION

In view of the above discussion, it is an object of the present invention to facilitate reducing the potential for fire caused by fuel leaks in high pressure direct injection fuel systems for internal combustion engines.

It is another object of the present invention to provide fuel pressure monitoring and control for high pressure direct injection fuel systems wherein only a single connection in a fuel rail is required.

These and other objects of the present invention are provided by pressure regulating devices for high pressure fluid systems, such as fuel systems, wherein a pressure sensing element is attached directly to a pressure chamber within a pressure regulating device. According to one embodiment of the present invention, a sense tube assembly is disposed within an axial bore of a housing. The sense tube assembly includes a longitudinally extending outer tube having a longitudinally extending inner tube disposed within the outer tube to define a fuel pressure chamber.

The outer tube has a tubular body terminating at an open end and at an opposite closed end. A longitudinally extending channel is formed along the inner surface of the outer tube body from the outer tube open end toward the outer tube closed end.

The inner tube has a tubular body terminating at an open end and at an opposite closed end. The inner tube closed end includes an aperture formed therethrough. A radially extending flange is positioned adjacent the inner tube open end and has an aperture formed through a portion thereof. The longitudinally extending channel in the outer tube is in fluid communication with a fuel inlet passageway in the housing via the flange aperture. The longitudinally extending channel in the outer tube forms a fuel flow path between the inner tube and the outer tube from the fuel inlet passageway to the fuel pressure chamber.

A magnetic pole piece is disposed within the inner tube and includes opposite first and second ends and an internal bore that terminates at the magnetic pole piece first and second ends. The magnetic pole piece internal bore is in fluid communication with a fuel outlet passageway in the housing.

A magnetic armature is slidably secured within the inner tube between the magnetic pole piece and the inner tube closed end. The magnetic armature includes a body having a pair of slots formed in the outer surface thereof and terminating at opposite first and second ends. The magnetic armature second end is configured to matingly engage the aperture in the inner tube closed end. The slots formed in the armature are in fluid communication with the magnetic pole piece internal bore. A spring, located between the magnetic armature and magnetic pole piece, is configured to bias the magnetic armature away from the magnetic pole piece and to cause the magnetic armature second end to matingly engage the aperture in the inner tube closed end.

A pressure sensing element is attached to the outer tube closed end and is configured to measure fuel pressure within the pressure chamber. The pressure sensing element includes a semiconductor element that deflects in response to a deflection of the outer tube second end caused by pressure within the pressure chamber. A coil disposed within the housing is electrically connected with the pressure sensing element and is configured to generate a magnetic field responsive to electrical signals from the pressure sensing element. The magnetic field moves the magnetic armature axially within the inner tube to control fuel pressure by allowing fuel entering the pressure chamber via the fuel inlet passageway to exit via a fuel outlet passageway.

Because the present invention combines a pressure sensing element and pressure regulator within a single device, only a single connection in a fuel rail is required. Accordingly, the number of potential sources of fuel leaks is reduced by the present invention.

According to another embodiment of the present invention, a controller, such as a proportional-integral-derivative (PID) controller, may be electrically connected with the pressure sensing element to create a "smart solenoid" whereby fuel pressure can be maintained within a prescribed range of pressures. The controller closes the loop around the sensed pressure via the pressure sensing element and adjusts the voltage to the coil which controls the axial movement of the magnetic armature within the inner tube in order to maintain fuel pressure within a predetermined range.

According to another embodiment of the present invention, a post-assembly calibration method is provided to compensate for mechanical strain imposed on pressure sensing elements during assembly of pressure regulating devices. A pressure sensing element attached to a pressure chamber within a pressure regulating device housing is electrically connected to an electrical terminal located external to the housing. The pressure sensing element is then calibrated to compensate for mechanical strain imposed on the pressure sensing element during assembly by transmitting electrical signals to the pressure sensing element via the electrical terminal.

The present invention may be utilized with various high pressure fluid systems, and is not limited to high pressure fuel systems.

BRIEF DESCRIPTION OF THE DRAWINGS

FIG. 7 is an enlarged side, section view of the pressure regulating apparatus of FIG. 2 illustrating the pressure sensing element that is attached to the outer surface of the outer tube second end.

FIG. 8 is a bottom plan view of the electrical connector socket of the pressure regulating apparatus of FIG. 2 illustrating the electrical terminals contained therein.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 2:
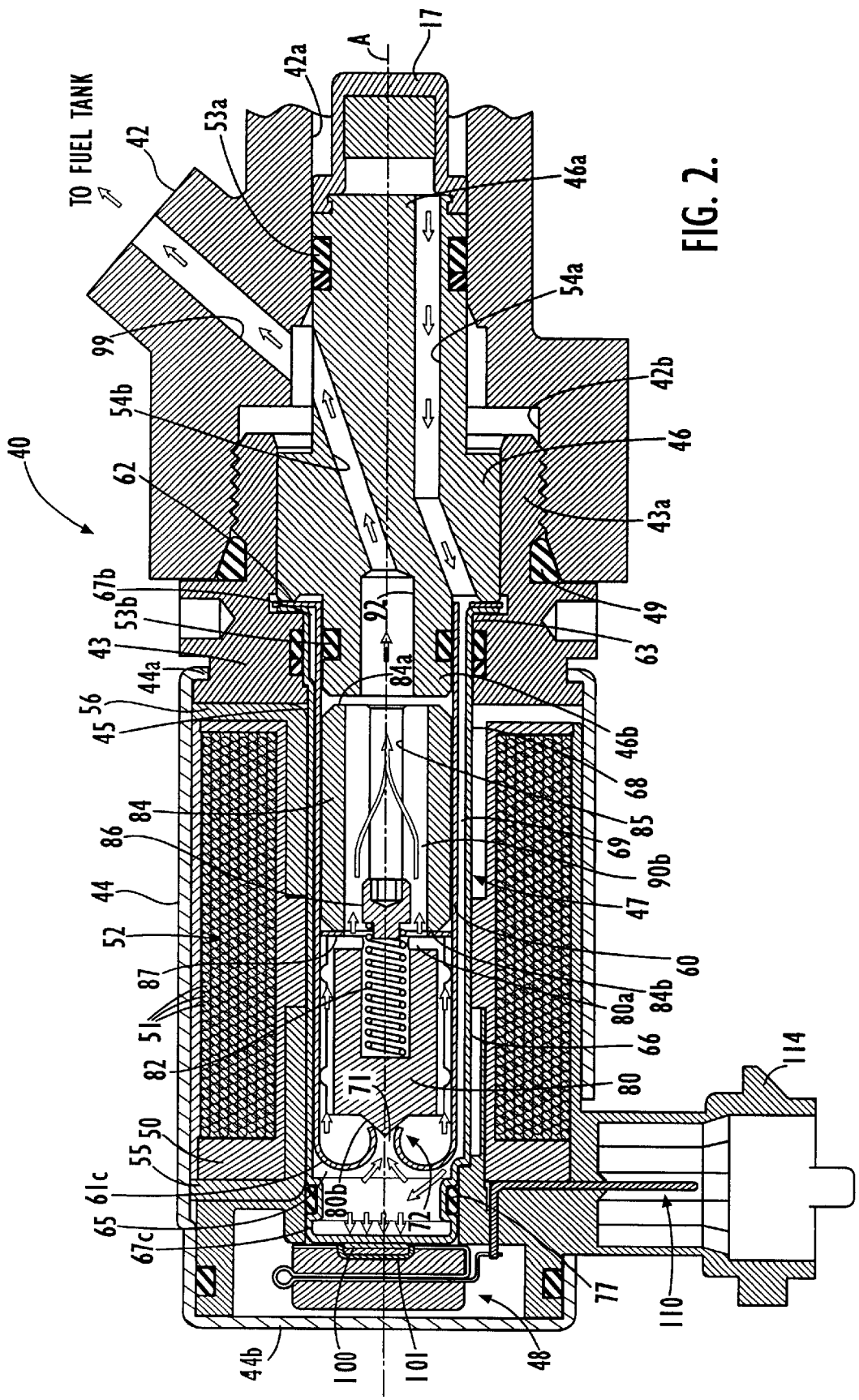
FIG. 2 is a side, section view of a fuel pressure regulating apparatus according to an embodiment of the present invention.

Referring now to FIG. 2, a pressure regulating apparatus 40 according to an embodiment of the present invention is illustrated. The pressure regulating apparatus 40, which is in fluid communication with a fuel rail 42, includes an annular first housing portion 43 and an annular magnetic flux housing 44 which are collectively referred to herein as a "housing" that has an axial bore 45 extending therethrough. The axial bore 45 defines a longitudinally extending axial direction, indicated by reference letter A, and is configured to receive a flow plug 46, sense tube assembly 47 and pressure sensing element 48 as will be described in detail below.

The illustrated fuel rail 42 includes a first end portion 42a that is configured to receive an end portion 46a of a flow plug 46. In the illustrated embodiment, a filter 17 is attached to the flow plug end portion 46a to prevent foreign materials entrained within fuel from entering the pressure regulating apparatus 40. The fuel rail 42 is in fluid communication with a fuel inlet passageway 54a and a fuel outlet passageway 54b in the flow plug 46.

The illustrated fuel rail 42 also includes a second end portion 42b that is threadingly engaged with a first end portion 43a of the annular first housing portion 43. An O-ring 49 is configured to maintain a sealed engagement between the fuel rail 42 and the annular first housing portion 43 as would be understood by one skilled in the art.

The annular flux housing 44 has opposite first and second end portions 44a, 44b. The annular flux housing 44 is configured to enclose an insulating bobbin 50 disposed therewithin and having conductive wire 51 coiled therearound to define a coil 52 for generating a magnetic field when electrical current flow is induced therein. The coil 52 generates a magnetic field which causes magnetic flux to flow through the flux housing 44, into the upper flux washer 55, into a magnetic armature 80, into a magnetic pole piece 84, into a lower flux washer 56, and then back to the flux housing 44. The flow of magnetic flux causes the magnetic armature 80 to move axially within the sense tube assembly 47. This magnetic force is assisted by the fuel pressure force pushing on the magnetic armature 80 at the poppet seat 72. Opposing these two forces is the force of the armature spring 82. The balancing of these forces is what allows for pressure regulation of fuel within the fuel rail 42. Coils for moving magnetic armatures (or solenoids) are well understood by those skilled in this art and need not be described further herein.

The flow plug 46 is positioned within the axial bore 45 as illustrated. The flow plug 46 has a first end 46a secured within the fuel rail 42. The flow plug 46 includes a fuel inlet passageway 54a and a fuel outlet passageway 54b. The fuel inlet passageway 54a is in fluid communication with the fuel rail 42. The flow plug 46 has an opposite second end portion 46b secured within an inner tube 60 of the sense tube assembly 47. An O-ring 53a is configured to prevent fuel leakage between the flow plug first end 46a and the fuel rail 42, and an O-ring 53b is configured to prevent fuel leakage between the flow plug second end 46b and the inner tube 60 as would be understood by one skilled in the art. Fuel enters the pressure regulating apparatus 40 from the fuel rail 42 via the fuel inlet passageway 54a and exits from the pressure regulating apparatus 40 via the fuel outlet passageway 54b, as will be described in detail below.

The illustrated sense tube assembly 47 disposed within the axial bore 45 includes a longitudinally extending inner tube 60 disposed within a longitudinally extending outer tube 66. The inner tube 60 and outer tube 66 will now be described in detail with reference to FIGS. 3A–3B and FIGS. 4A–4B, respectively.

Figure 3A:
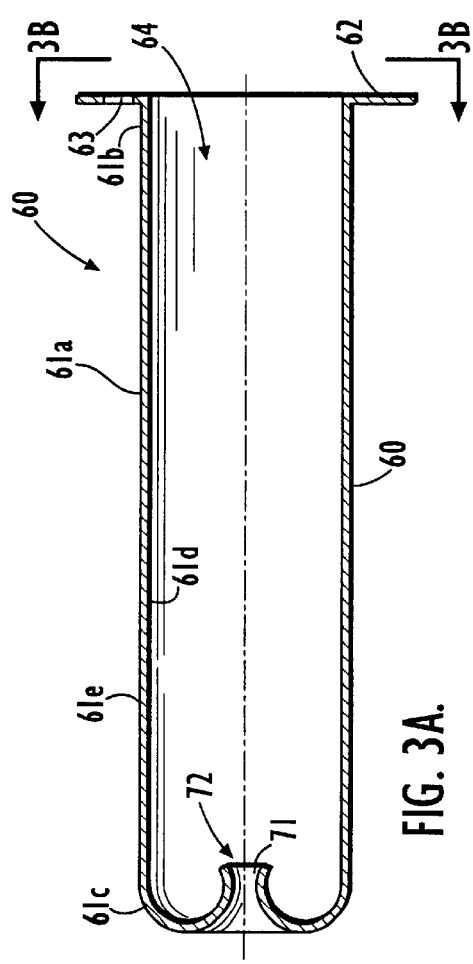
FIG. 3A is a side, section view of the inner tube of the sense tube assembly within the pressure regulating apparatus of FIG. 2.

Referring to FIG. 3A, a side, section view of the inner tube 60 is illustrated. The illustrated inner tube 60 includes a tubular (preferably cylindrical) body 61a with an open end 61b and a closed end 61c, and inner and outer surfaces 61d, 61e. The inner tube 60 defines an elongated, cylindrical chamber 64 extending between the open and closed ends 61b, 61c that is configured to receive the magnetic armature 80 and a pole piece 84 as described below.

Figure 3B:
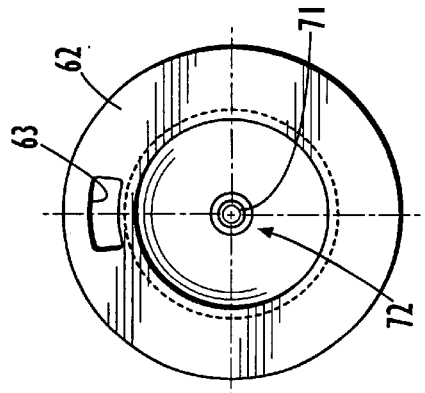
FIG. 3B is an end view of the inner tube of FIG. 3A illustrating an aperture formed in the flange that permits fuel to flow from the fuel inlet passageway into the fuel flow path between the inner tube and the outer tube.

The inner tube closed end 61c has an annular configuration that defines an aperture 71. As will be described below, the aperture 71 defines a poppet seat 72 for receiving the armature first end 80a (FIG. 2) in mating relationship. A radially extending flange 62 is positioned adjacent the inner tube open end 61b, as illustrated. An aperture 63 is formed through a portion of the flange 62, as illustrated. FIG. 3B is an end view of the inner tube 60 illustrating the flange 62 and the aperture 63 formed therein.

Figure 4A:
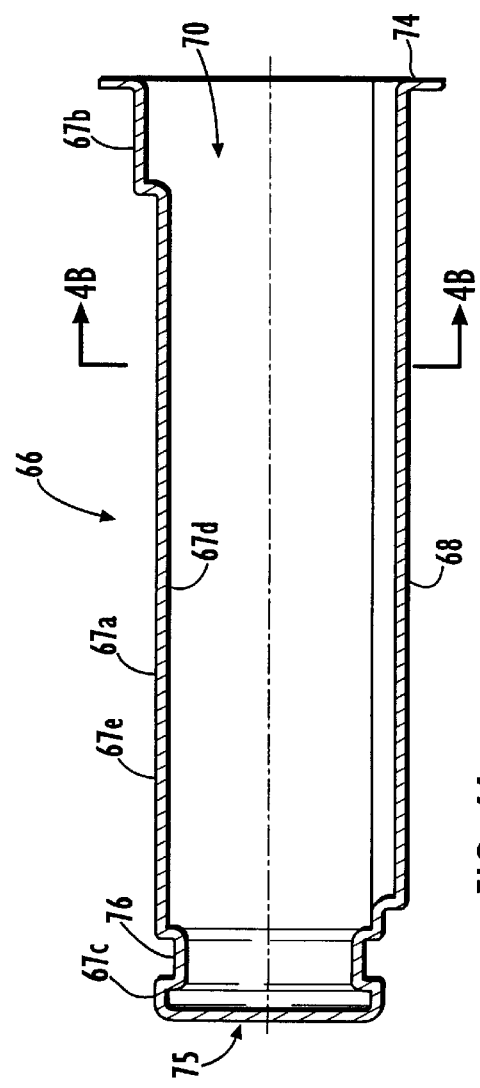
FIG. 4A is a side, section view of the outer tube of the sense tube assembly within the pressure regulating apparatus of FIG. 2.
Figure 4B:
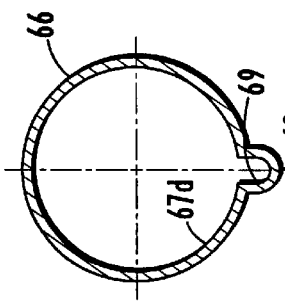
FIG. 4B is a section view of the outer tube of FIG. 4A illustrating a longitudinally extending channel which forms a fuel flow path between the inner tube and outer tube of the sense tube assembly.

Referring to FIG. 4A, a side, section view of the outer tube 66 is illustrated. The outer tube 66 includes a tubular body 67a having an open end 67b and an opposite closed end 67c, and having inner and outer surfaces 67d, 67e. A longitudinally extending channel 68 is formed along the inner surface 67d of the outer tube body 67a from the outer tube open end 67b toward the outer tube closed end 67c. FIG. 4B is a section view of the outer tube 62 that illustrates the cross-sectional contour of the longitudinally extending channel 68.

The outer tube 66 defines an elongated, cylindrical chamber 70 extending between the open and closed ends 67b, 67c that is configured to receive the inner tube 60 therewithin. The outer tube open end 67b includes a radially extending flange 74 adjacent thereto as illustrated. The flange 74 abuts the flange 62 of the inner tube 60 when the inner tube 60 is assembled within the outer tube chamber 70 (as illustrated in FIG. 2).

The outer tube second end 67c has an outer surface 75 to which the pressure sensing element 48 (FIG. 2) is attached. In the illustrated embodiment, a slot 76 circumferentially extends around the outer tube 66 adjacent the second end 67c as illustrated in FIG. 4A. The slot 76 is configured to receive an O-ring (77, FIG. 2) that is configured to seal the outer tube 66 within the axial bore 45 as would be understood by one skilled in the art.

When the inner and outer tubes 60, 66 are assembled to form the sense tube assembly 47, the outer surface 61e of the inner tube body 61a is in contacting relationship with the inner surface 67d of the outer tube body 67a to define a pressure chamber 65 between the outer tube closed end and the inner tube closed end, as illustrated in FIG. 2. The fit between the inner tube 60 and the outer tube 62 is sufficiently snug such that fuel within a pressure range of between about 0 pounds per square inch (psi) and about 3,000 psi is prevented from leaking therebetween.

Preferably, the inner tube 60 is formed from non-magnetic material including, but not limited to, non-magnetic stainless steel having a thickness of between about 0.012 inches and about 0.018 inches. Preferably, the outer tube 66 is formed from non-magnetic material including, but not limited to, non-magnetic stainless steel having a thickness of between about 0.012 inches and about 0.018 inches.

In addition, the longitudinally extending channel 68 in the outer tube 66 forms a fuel flow path 69 located between the inner tube 60 and the outer tube 66. The aperture 63 in the inner tube flange 62 is aligned with an annular ring on the outer tube. This annular ring creates a cavity 67e which feeds the fuel flow path 69 so that the fuel inlet passageway 54a is in fluid communication with the fuel flow path 69. Accordingly, fuel can flow from the fuel inlet passageway 54a into the pressure chamber 65 via the fuel flow path 69.

Referring back to FIG. 2, the magnetic armature 80, a spring 82 and the magnetic pole piece 84 are disposed within the inner tube chamber 64, as illustrated. The magnetic armature 80 includes opposite first and second ends 80a, 80b and is slidably secured within the inner tube chamber 64. The magnetic armature 80 is configured to move along the axial direction A in response to a magnetic field generated by the coil 52. The magnetic pole piece 84 is fixed within the inner tube chamber 64 adjacent the magnetic armature first end 80a and includes opposite first and second ends 84a, 84b, as illustrated.

The magnetic armature 80 is biased via the spring 82 along the axial direction A away from the pole piece second end 84b and toward the inner tube second end 61c. The magnetic armature second end 80b is configured to matingly engage with the poppet seat 72 formed in the inner tube second end 61c to prevent passage of fuel into the inner tube chamber 64. In the illustrated embodiment, the magnetic armature 80 is mechanically loaded to a closed position when current is not induced within the coil 52. However, it is understood that the magnetic armature 80 may be mechanically loaded to an open position via the spring 82 when current is not induced within the coil 52.

Still referring to FIG. 2, the magnetic pole piece 84 includes an axial bore 85 extending along the axial direction A between the opposite first and second ends 84a, 84b, as illustrated. A portion of the magnetic pole piece axial bore adjacent the pole piece second end 84a is threaded and configured to receive a correspondingly-threaded adjusting screw 86 therein as illustrated. The adjusting screw 86 is configured to adjust or calibrate the position of the magnetic armature second end 80b with respect to the poppet seat 72 at the inner tube second end 61c by compressing or expanding the spring 82, as would be understood by one of skill in the art.

The annular flux housing 44, magnetic armature 80, upper and lower flux washers 55, 56 and magnetic pole piece 84 form a magnetic flux circuit such that flow of electrical current within the coil 52 produces a magnetic field that causes the magnetic armature first end 80a to move in the axial direction A within the inner tube 60 toward the pole piece second end 84b. The spring 82 biases against the magnetic armature first end 80a to counter the magnetic force attracting the magnetic armature 80 towards the pole piece 84. As would be understood by one of skill in the art, the amount of movement of the magnetic armature 80 may be controlled by controlling the amount of electrical current applied to the coil 52 and/or by selecting a spring that has a desired spring rate. Fuel pressure exerted on the magnetic armature is typically between about 0 psi and about 1,500 psi.

Figure 5B:
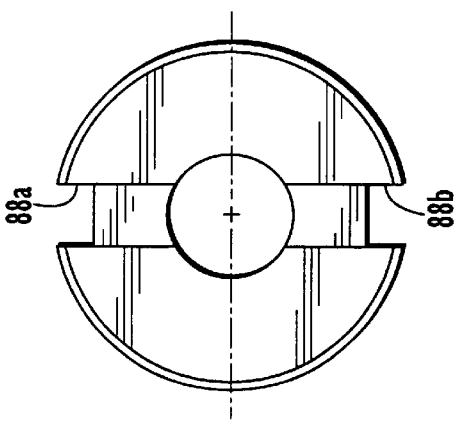
FIG. 5B is an enlarged end view of the magnetic armature of FIG. 5A taken along lines 5B—5B.
Figure 5A:
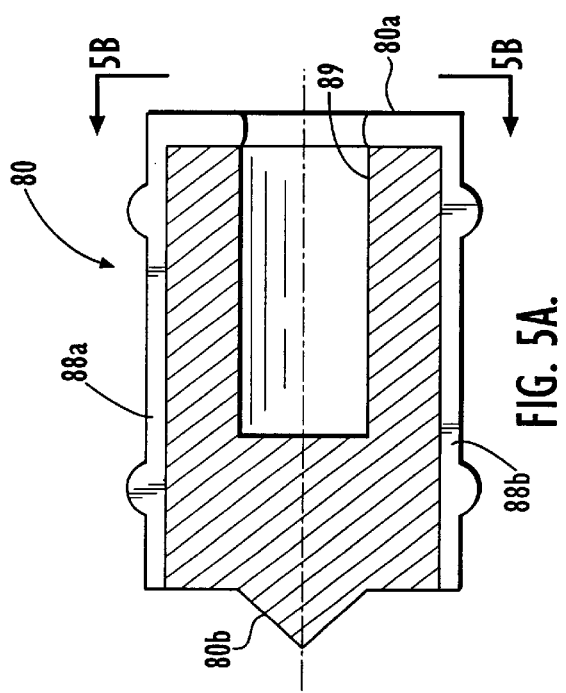
FIG. 5A is an enlarged section view of the magnetic armature in the pressure regulating apparatus of FIG. 2.

Referring now to FIGS. 5A–5B, the configuration of the magnetic armature 80 illustrated in FIG. 2 is shown in enlarged detail. The second end 80b has a conical-shaped projection 80c that is configured to matingly engage with the poppet seat 72 formed in the inner tube second end 61c. The magnetic armature 80 includes a pair of diametrically opposed slots 88a, 88b that extend between the opposite first and second ends 80a, 80b. Slots 88a, 88b allow fuel passing through the inner tube aperture 71 from the pressure chamber 65 to flow past the magnetic armature 80 and into the axial bore 85 of the magnetic pole piece 84. It is understood that the magnetic armature 80 may have various shapes and configurations and is not limited to the illustrated embodiment. For example, the magnetic armature 80 may have a "D" shape (in lieu of slots 88a, 88b) which allows fuel to flow past the magnetic armature 80 and into the axial bore 85 of the magnetic pole piece 84.

The magnetic armature 80 also includes a bore 89 that extends partially into the magnetic armature from the first end 80a. The bore 89 is configured to receive the spring (82, FIG. 2) therein for biasing the magnetic armature away from the magnetic pole piece second end 84b.

Figure 6B:
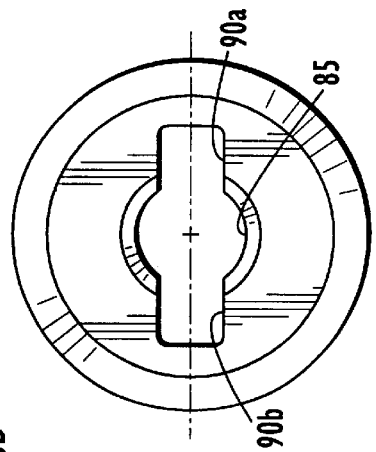
FIG. 6B is an enlarged end view of the magnetic pole piece of FIG. 6A taken along lines 6B—6B.
Figure 6A:
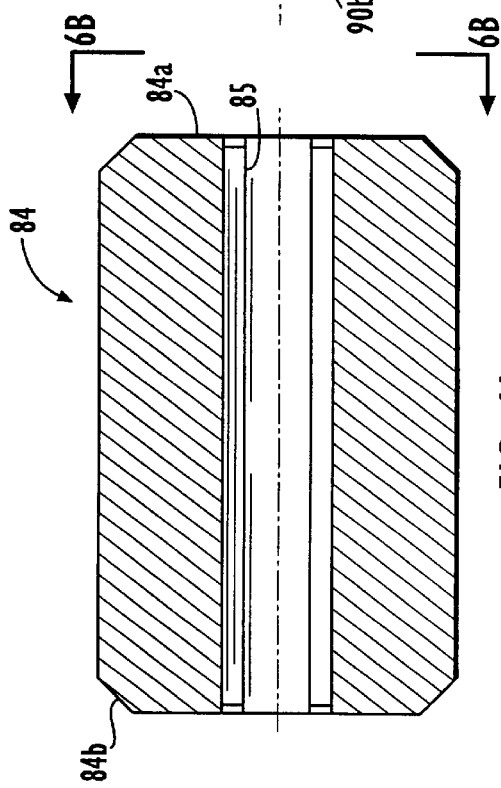
FIG. 6A is an enlarged section view of the magnetic pole piece in the pressure regulating apparatus of FIG. 2.

Referring now to FIGS. 6A–6B, the configuration of the magnetic pole piece 84 illustrated in FIG. 2 is shown in enlarged detail. The magnetic pole piece 84 includes the axial bore 85 and a pair of diametrically opposed slots 90a, 90b that extend between opposite first and second ends 84a, 84b. The slots 90a, 90b are in communication with the axial bore 85. The slots 84a, 84b and the axial bore 85 allow fuel flowing around the magnetic armature 80 to flow through the magnetic pole piece and into a chamber 92 within the flow plug 46 that is in fluid communication with the fuel outlet passageway 54b.

Referring back to FIG. 2, an air gap shim 87 is positioned between the magnetic armature 80 and the magnetic pole piece 84 as illustrated. The air gap shim 87 is formed from non-magnetic material and prevents magnetic "latch" from occurring between the magnetic armature 80 and the magnetic pole piece 84, as would be understood by one of skill in the art.

Referring now to FIG. 7, the pressure sensing element 48 that is mounted directly to the outer surface 75 of the second end 67c of the outer tube 66 is illustrated in enlarged detail. The pressure sensing element 48 preferably includes a semiconductor element 100 having an embedded resistive element such as a Wheatstone bridge. The semiconductor element 100 is preferably a planar substrate formed from silicon. However, the semiconductor element 100 may have various configurations and may be formed from various materials. In the illustrated embodiment, the semiconductor element 100 is surrounded by a protective covering or die cap 101.

As fuel pressure increases within the pressure chamber 65 (indicated by arrows P), the second end 67c of the outer tube 66 deflects toward the semiconductor element 100. The deflection of the second end 67c of the outer tube 66 causes the semiconductor element 100 to deflect which changes its resistance.

By applying a known voltage to the pressure sensing element 48 and monitoring the voltage drops across the pressure sensing element 48, changes can be detected. By applying a plurality of known pressures to the sense surface (i.e., the outer surface 75 of the second end 67c of the outer tube 66) and monitoring the voltage changes induced on the pressure sensing element 48 by these known pressures, the pressure sensing element 48 can be accurately calibrated to produce a pressure transducer.

As would be understood by one of skill in the art, electrical resistive strain devices produce a varying resistance when strained by a mechanical force. Accordingly, deflection of the second end 67c of the outer tube 66 causes the semiconductor element 100 to deflect and, thus, change resistance. By supplying a voltage to the semiconductor element 100, a sensed voltage that is proportional to the amount of fuel pressure within the pressure chamber 65 can be generated. An exemplary pressure sensing element 48 is disclosed in co-pending and co-assigned U.S. patent application Ser. No. 08/840,363, filed Apr. 28, 1997, which is incorporated herein by reference in its entirety.

Figure 1:
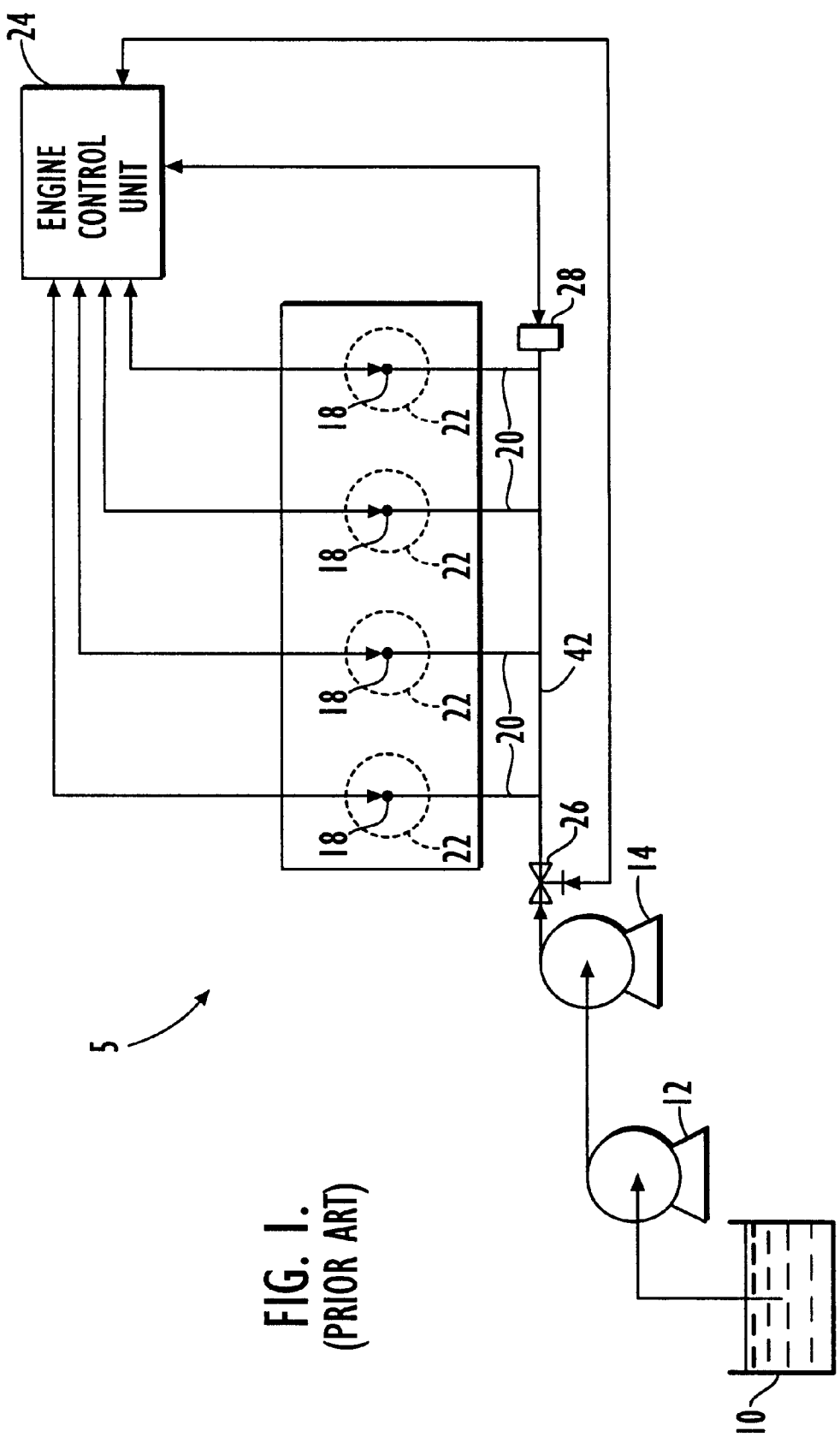
FIG. 1 is a schematic illustration of a conventional direct injection fuel system for an internal combustion engine.

A flex circuit assembly 102 that includes electronics to supply the resistive bridge with voltage and process the voltage signals of the semiconductor element 100 is electrically connected to the semiconductor element 100 via lead 102a. Lead 102b electrically connects the flex circuit assembly 102 to an electrical terminal 110a. Electrical terminal 110a is preferably electrically connected with an ECU (24, FIG. 1) via an electrical cable inserted within the socket 114. In the illustrated embodiment, the flex circuit assembly 102 is embedded within a dielectric material 103 such as KAPTON® flexible film (E. I. du Pont de Nemours and Company, 1007 Market St., Wilmington, Del.). Flexible dielectric films are well known by those having skill in the art and need not be described further herein.

The output from the pressure sensing element 48 is typically a 0.0–5.0 volt direct current (DC) analog signal. However, the output from the pressure sensing element 48 may also be a digital data stream. The output from the pressure sensing element 48 is preferably generated internally via an application specific integrated circuit (ASIC) which has a processor built therein. The processor takes a voltage reading from the semiconductor element 100 and a voltage reading that is proportional to temperature and generates the output voltage.

The flex circuit assembly 102 preferably includes a static ground protection system and an electromagnetic interference (EMI) circuit to dampen out background radiation. Static ground protection systems and EMI circuits are well known by those of skill in the art and need not be described further herein.

Preferably, additional terminals 110b–110e are housed within the socket 114, as illustrated in FIG. 8. As would be understood by one of skill in the art, terminals 110b–110e may be provided to perform various functions, including: providing electrical power to the coil 52; providing ground; providing an output line from the pressure sensing element 48; providing power to the pressure sensing element 48; and providing ground.

Pressure Sensing Element Calibration

Prior to final assembly of the pressure regulating apparatus 40, the electronic pressure sensing element 48 is typically calibrated. However, assembly of the pressure regulating apparatus 40 may induce mechanical strain on the outer tube 66 and/or the pressure sensing element 48 which may, in turn, negatively affect any pre-assembly calibration efforts. According to another embodiment of the present invention, calibration of a pressure sensing element housed within a pressure regulating apparatus can be performed after assembly is complete.

Figure 9:
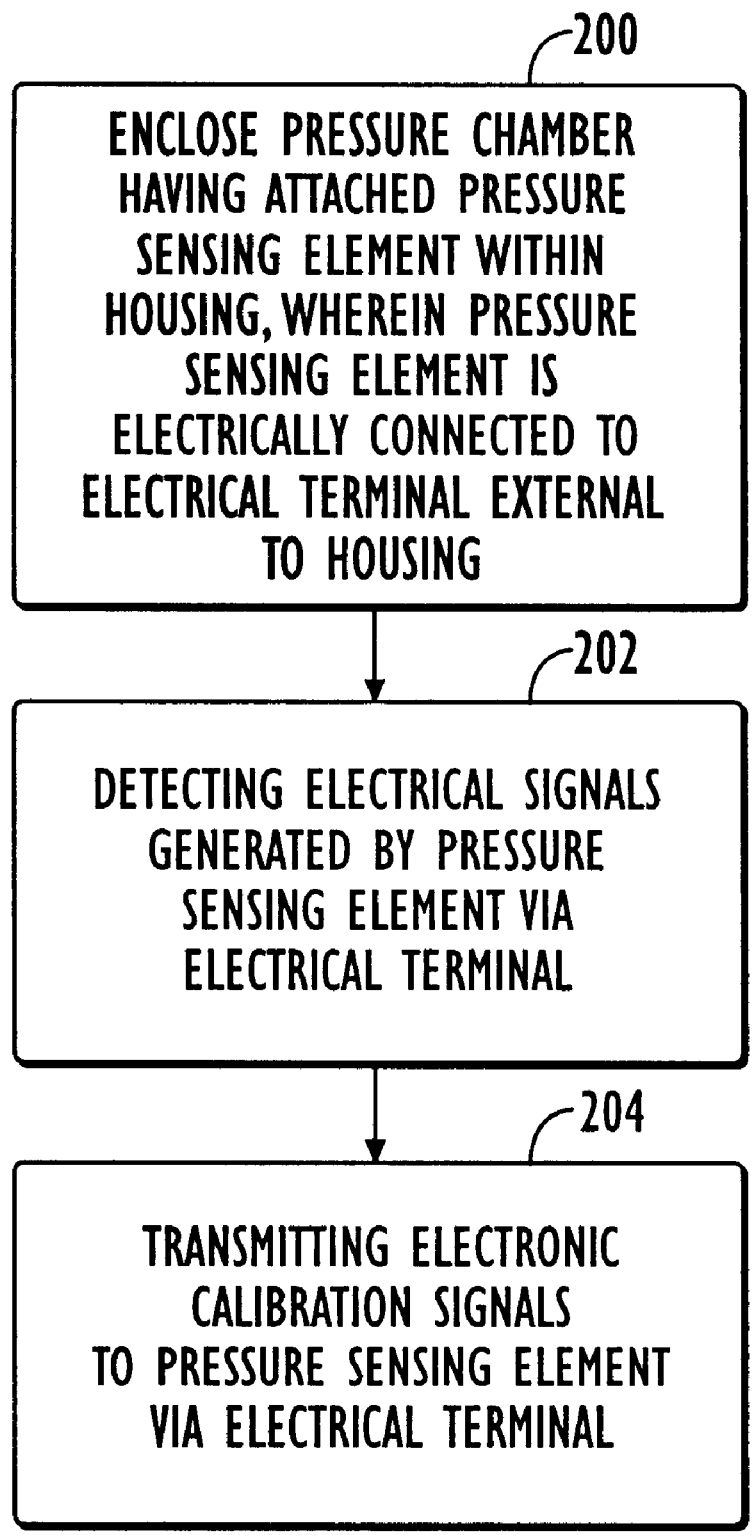
FIG. 9 is a schematic illustration of operations for calibrating a pressure sensing element within a pressure regulating apparatus according to the present invention to compensate for mechanical strain imposed on the pressure sensing element during assembly.

Referring now to FIG. 9, operations for calibrating a pressure sensing element within a pressure regulating apparatus to compensate for mechanical strain imposed on the pressure sensing element during assembly of the pressure regulating apparatus are illustrated. A pressure chamber and pressure sensing element attached thereto is enclosed within a housing, such that the pressure sensing element is electrically connected to an electrical terminal located external to the housing (Block 200). Electrical signals generated by the pressure sensing element are detected via the electrical terminal (Block 202). Finally, the pressure sensing element is then calibrated to compensate for mechanical strain imposed thereon during assembly by transmitting electrical signals to the pressure sensing element via the electrical terminal (Block 204).

Because actual changes in voltage generated by the pressure sensing element 48 are small, temperature can play an important role in calibration of the pressure sensing element 48. Calibration is preferably performed by applying known pressures to the pressure sensing element 48 while the pressure sensing element 48 is at different temperatures and then monitoring the voltage signals produced by the pressure sensing element 48. The output signal from the pressure sensing element 48 can then be adjusted.

Preferably, an electrical terminal for transmitting the output signal from the pressure sensing element 48 is utilized as a digital input/output (I/O) port to program the ASIC. The ASIC has a monitoring circuit that checks the electrical terminal for digital communications. The electrical terminal thus allows the pressure sensing element 48 to be calibrated after the pressure regulating apparatus 40 has been assembled. By contrast, calibration of conventional pressure sensors is performed prior to final assembly.

Direct Injection Fuel System

Figure 10:
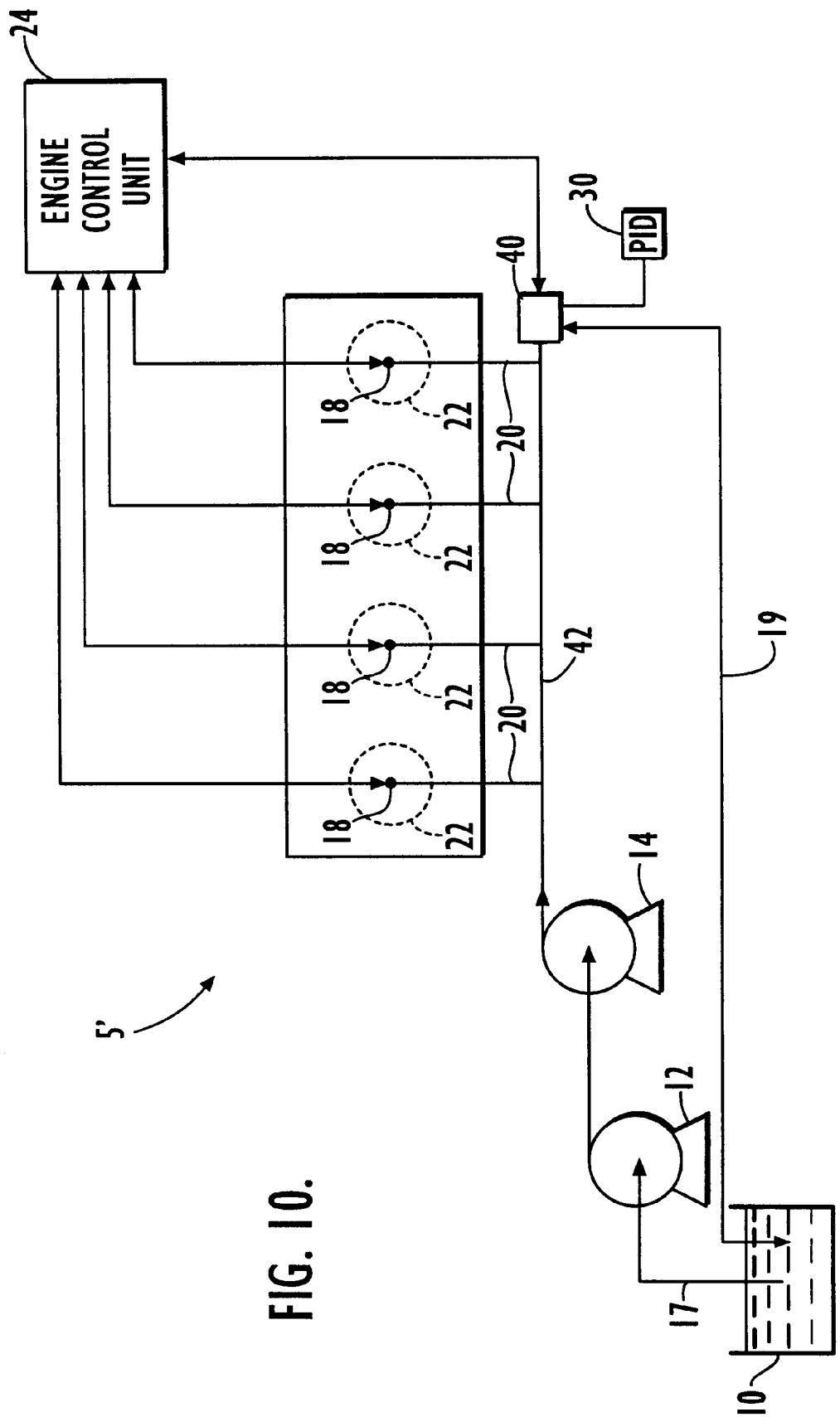
FIG. 10 is a schematic illustration of a direct injection fuel system incorporating various aspects of the present invention.

Referring now to FIG. 10, a direct injection fuel system 5' for an internal combustion engine incorporating a pressure regulating apparatus according to various aspects of the present invention is schematically illustrated. The illustrated direct injection fuel system 5' includes a fuel tank 10, a fuel rail 42, and a fuel supply line 17 connecting the fuel tank 10 and the fuel rail 42. A high pressure booster pump 14 is provided for pumping fuel from the fuel tank 10 to the fuel rail 42 via the fuel supply line 17. As described above with respect to FIG. 1, a low pressure fuel pump 12 may also be utilized, as would be understood by one skilled in the art. A plurality of fuel injectors 18 are in fluid communication with the fuel rail 42 and each fuel injector 18 is configured to directly inject fuel from the fuel rail 42 into a respective combustion chamber 22 within the internal combustion engine.

A pressure regulating apparatus 40 as described above is in fluid communication with the fuel rail 42. A fuel return line 19 connects the pressure regulating apparatus 40 and the fuel tank 10 and is configured to return fuel exiting from the pressure regulating apparatus 40 to the fuel tank.

As will be described below, a controller 30 may be electrically connected with a pressure sensing element within the pressure regulating apparatus 40 and configured to maintain fuel pressure within a prescribed range of pressures based upon the requested input. The controller 30 may be a proportional controller, a derivative controller, an integral controller, or some combination thereof. For example, the controller 30 may be a proportional-derivative controller, a proportional-integral controller, or a proportional-integral-derivative (PID) controller. Each of the above-mentioned types of controllers are well known to those skilled in the art and need not be described further herein.

Pressure Regulating Apparatus Operation

Referring back to FIG. 2, operation of the illustrated pressure regulating apparatus 40 will now be described. High pressure fuel enters the pressure regulating apparatus 40 from the fuel rail 42 through the fuel inlet passageway 54*a* in the flow plug 46. The fuel passes through the aperture 63 in the flange 62 of the inner tube 60 and into the fuel flow path 69 between the inner and outer tubes 60, 66. The fuel flows through the fuel flow path 69 and into the pressure chamber 65 between the outer tube closed end 67*c* and the inner tube closed end 61*c*.

Fuel pressure within the pressure chamber 65 causes the outer tube closed end 67*c* to deflect, which in turn causes the semiconductor element 100 within the pressure sensing element 48 to deflect. As would be understood by one of skill in the art, the resistance in the Wheatstone bridge embedded within the semiconductor element 100 changes with the deflection (strain) in the strain in the semiconductor element 100 to produce an output voltage when a constant current is applied via terminal 110*a*. The output voltage is proportional to the deflection of the semiconductor element 100 which is proportional to the fuel pressure in pressure chamber 65. As would be understood by one of skill in the art, the fuel pressure measured in the pressure chamber 65 will be the same as the fuel pressure within the fuel rail 42.

The pressure sensing element 48 reports fuel pressure in the fuel rail 42 back to the vehicle ECU (24, FIG. 10). The pressurized fuel also exerts positive pressure against the magnetic armature second end 80*b* through aperture 71 in the inner tube second end 61*c*.

To regulate fuel pressure within the fuel rail 42, a vehicle ECU reads the fuel pressure output signal from the pressure sensing element 48 and determines what the proper fuel pressure should be based upon various vehicle parameters including, but not limited to, throttle position, engine speed (RPM), transmission gear, and wheel slip. The ECU checks to see if the fuel pressure is where it should be, and if not, adjusts the signal to the pressure regulating apparatus 40 to change the fuel pressure to the desired level. As described above, fuel pressure is adjusted by applying electrical current to the coil 52. The generated magnetic field causes the magnetic armature 80 to move along the axial direction A toward the magnetic pole piece 84, which opens a leak path back to the fuel tank (10, FIG. 10) in the vehicle, thereby reducing fuel pressure in the fuel rail 42. The leak path is formed by the slots 88*a*, 88*b* in the magnetic armature 80, the axial bore 85 through the magnetic pole piece 84, the chamber 92 within the flow plug 46, the fuel outlet passageway 54*b* in the flow plug 46, and the fuel outlet passageway 99 in the annular first housing 42.

The pressure regulating apparatus 40 can also act as a pressure relief valve if fuel pressure exceeds a predetermined pressure limit. Excessive fuel pressure applied to the magnetic armature second end 80*b* can cause the spring 82 to compress, which will allow flow through the leak path and, thus, a reduction in fuel pressure.

According to another embodiment of the present invention, the controller (30, FIG. 10) may be electrically connected with a pressure sensing element 48 to create a "smart solenoid" (i.e., a closed loop feedback control system is incorporated into the pressure sensing electronics), whereby fuel pressure can be maintained within a prescribed range of pressures. The controller 30 closes the loop around the sensed pressure via the pressure sensing element 48 and adjusts, via current induced within the coil 52, axial movement of the magnetic armature 80 within the inner tube 60 in order to maintain fuel pressure within a predetermined range.

By reading the pressure sensing element 48, an ECU is able to see the effects that its changes are having on fuel pressure and can vary fuel pressure change requests. The control of how much change an ECU asks the pressure sensing element 48 to make and how quickly it should make that change is preferably controlled via proportional-integral-derivative (PID) control. A PID controller can allow a system to control the amount of overshoot that a fuel rail sees from the pressure regulating apparatus 40 and also can help insure that the pressure regulating apparatus 40 receives the required value quickly.

A pressure regulating apparatus according to the present invention provides a number of advantages. First, the number of electrical terminals required by a pressure regulating apparatus according to the present invention can be reduced from five to three. Second, the output signal line from a pressure regulating apparatus according to the present invention can change from analog to digital. Third, a pressure regulating apparatus according to the present invention can house the control electronics (e.g., a FET transistor, resistor, and capacitor) required to drive the coil.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A pressure sensing and pressure regulating apparatus for a fluid system, comprising:
    a housing;
    a pressure chamber within the housing comprising a wall configured to deflect responsive to fluid pressure within the pressure chamber;
    a pressure sensing device attached to the wall within the housing, wherein the pressure sensing device is configured to generate electrical signals responsive to deflection of the pressure chamber caused by fluid pressure within the pressure chamber; and
    a pressure regulating device within the housing comprising a valve member that is configured to relieve fluid pressure in the pressure chamber by allowing fluid to exit from the pressure chamber, wherein movement of the valve member is responsive to electrical signals generated by the pressure sensing device.

2. A pressure sensing and pressure regulating apparatus according to claim 1 wherein the pressure sensing device comprises a semiconductor element.

3. A pressure sensing and pressure regulating apparatus according to claim 1 wherein the valve member comprises a magnetic armature.

4. A pressure sensing and pressure regulating apparatus according to claim 3 further comprising a coil disposed within the housing, wherein the coil is electrically connected with the pressure sensing device, and wherein the coil is configured to generate a magnetic field responsive to electrical signals from the pressure sensing device that moves the magnetic armature to control fluid pressure within the pressure chamber by allowing fluid to exit from the pressure chamber.

5. A pressure sensing and pressure regulating apparatus according to claim 1 further comprising a controller electrically connected with the pressure sensing device and configured to maintain fluid pressure in the pressure chamber within a predetermined range of pressures, and wherein the controller is selected from the group consisting of proportional controllers, derivative controllers, integral controllers, proportional-derivative controllers, proportional-integral controllers, and proportional-integral-derivative controllers.

6. A pressure sensing and pressure regulating apparatus according to claim 1 wherein the fluid system comprises a fuel system.

7. A pressure regulating apparatus for a fluid system, comprising:
    a housing having an axial bore extending therethrough that defines a longitudinal direction, wherein the housing includes a fluid inlet passageway and a fluid outlet passageway;
    a sense tube assembly disposed within the axial bore, comprising:
        a longitudinally extending outer tube, comprising:
            a tubular body having an inner surface and an outer surface and having an open end and an opposite closed end; and
            a longitudinally extending channel formed along the inner surface of the outer tube body from the outer tube open end toward the outer tube closed end; and
        a longitudinally extending inner tube disposed within the outer tube, comprising:
            a tubular body having an inner surface and an outer surface and having an open end and an opposite closed end;
            wherein the inner tube closed end includes an aperture formed therethrough;
            wherein the outer surface of the inner tube body is in contacting relationship with the inner surface of the outer tube body to define a pressure chamber between the outer tube closed end and the inner tube closed end; and
            wherein the longitudinally extending channel is in fluid communication with the fluid inlet passageway and forms a fluid flow path between the inner tube and the outer tube from the fluid inlet passageway to the pressure chamber;
    a magnetic pole piece disposed within the inner tube, comprising:
        opposite first and second ends; and
        an internal bore that terminates at the magnetic pole piece first and second ends, wherein the internal bore is in fluid communication with the fluid outlet passageway;
    a magnetic armature slidably secured within the inner tube between the magnetic pole piece and the inner tube closed end, comprising:
        a body having an outer surface and terminating at opposite first and second ends, wherein the magnetic armature second end is configured to matingly engage the aperture in the inner tube closed end; and
        a longitudinally extending passageway that terminates at the magnetic armature first and second ends and that is in fluid communication with the magnetic pole piece internal bore;
    biasing means configured to bias the magnetic armature away from the magnetic pole piece and to cause the magnetic armature second end to matingly engage the aperture in the inner tube closed end;
    a pressure sensing element attached to the outer tube closed end, wherein the pressure sensing element is configured to measure fluid pressure within the pressure chamber; and
    a coil disposed within the housing, wherein the coil is configured to generate a magnetic field responsive to electrical signals from the pressure sensing element that moves the magnetic armature axially within the inner tube to control fluid pressure by allowing fluid entering the pressure chamber via the fluid inlet passageway to exit via the fluid outlet passageway.

8. A pressure regulating apparatus according to claim 7 wherein the inner tube further comprises:
    a radially extending flange adjacent the inner tube open end; and
    an aperture formed through a portion of the flange, wherein the longitudinally extending channel in the outer tube is in fluid communication with the fluid inlet passageway via the flange aperture and forms a fluid flow path between the inner tube and the outer tube from the fluid inlet passageway to the pressure chamber.

9. A pressure regulating apparatus according to claim 7 wherein the inner tube second end has an annular configuration.

10. A pressure regulating apparatus according to claim 7 wherein the longitudinally extending passageway in the magnetic armature comprises a longitudinally extending slot formed in the outer surface of the magnetic armature body.

11. A pressure regulating apparatus according to claim 7 wherein the magnetic armature comprises a pair of diametrically opposed longitudinally extending slots formed in the outer surface of the magnetic armature body.

12. A pressure regulating apparatus according to claim 7 wherein the body of the inner tube and the body of the outer tube each have respective cylindrical configurations.

13. A pressure regulating apparatus according to claim 7 wherein the pressure sensing element comprises a semiconductor element that deflects in response to a deflection of the outer tube second end caused by pressure within the pressure chamber.

14. A pressure regulating apparatus according to claim 13 wherein the semiconductor element comprises an embedded Wheatstone bridge.

15. A pressure regulating apparatus according to claim 7 further comprising means for adjusting axial movement of the magnetic armature within the inner tube relative to a magnetic field produced by the coil.

16. A pressure regulating apparatus according to claim 7 further comprising a controller electrically connected with the pressure sensing element and configured to maintain fluid pressure within a prescribed range of pressures, and wherein the controller is selected from the group consisting of proportional controllers, derivative controllers, integral controllers, proportional-derivative controllers, proportional-integral controllers, and proportional-integral-derivative controllers.

17. A pressure sensing and pressure regulating apparatus according to claim 7 wherein the fluid system comprises a fuel system.

18. A pressure regulating apparatus for a fuel system, comprising:
  a housing having an axial bore extending therethrough that defines a longitudinal direction, wherein the housing includes a fuel inlet passageway and a fuel outlet passageway;
  a sense tube assembly disposed within the axial bore, comprising:
    a longitudinally extending outer tube, comprising:
      a tubular body having an inner surface and an outer surface and having an open end and an opposite closed end; and
      a longitudinally extending channel formed along the inner surface of the outer tube body from the outer tube open end toward the outer tube closed end; and
    a longitudinally extending inner tube disposed within the outer tube, comprising:
      a tubular body having an inner surface and an outer surface and having an open end and an opposite closed end;
      a radially extending flange adjacent the inner tube open end, wherein a first aperture is formed through a portion of the flange;
      wherein the inner tube closed end includes a second aperture formed therethrough;
      wherein the outer surface of the inner tube body is in contacting relationship with the inner surface of the outer tube body to define a pressure chamber between the outer tube closed end and the inner tube closed end; and
      wherein the longitudinally extending channel is in fluid communication with the fuel inlet passageway via the first aperture and forms a fuel flow path between the inner tube and the outer tube from the fuel inlet passageway to the pressure chamber;
    a magnetic pole piece disposed within the inner tube, comprising:
      opposite first and second ends; and
      an internal bore that terminates at the magnetic pole piece first and second ends, wherein the internal bore is in fluid communication with the fuel outlet passageway;
    a magnetic armature slidably secured within the inner tube between the magnetic pole piece and the inner tube closed end, comprising:
      a body having an outer surface and terminating at opposite first and second ends, wherein the magnetic armature second end is configured to matingly engage the second aperture in the inner tube closed end; and
      a pair of diametrically opposed longitudinally extending slots formed in an outer surface of the magnetic armature body;
      a longitudinally extending passageway that terminates at the magnetic armature first and second ends and that is in fluid communication with the magnetic pole piece internal bore;
    biasing means configured to bias the magnetic armature away from the magnetic pole piece and to cause the magnetic armature second end to matingly engage the second aperture in the inner tube closed end;
    a pressure sensing element attached to the outer tube closed end, wherein the pressure sensing element comprises a semiconductor element that deflects when the outer tube closed end deflects as a result of pressure within the pressure chamber; and
    a coil disposed within the housing, wherein the coil is configured to generate a magnetic field responsive to electrical signals from the pressure sensing element that moves the magnetic armature axially within the inner tube to control fuel pressure by allowing fuel entering the pressure chamber via the fuel inlet passageway to exit via the fuel outlet passageway.

19. A pressure regulating apparatus according to claim 18 wherein the inner tube second end has an annular configuration.

20. A pressure regulating apparatus according to claim 18 wherein the longitudinally extending passageway in the magnetic armature comprises a longitudinally extending slot formed in an outer surface of the magnetic armature body.

21. A pressure regulating apparatus according to claim 18 wherein the body of the inner tube and the body of the outer tube each have respective cylindrical configurations.

22. A pressure regulating apparatus according to claim 18 wherein the semiconductor element comprises an embedded Wheatstone bridge.

23. A pressure regulating apparatus according to claim 18 further comprising means for adjusting axial movement of the magnetic armature within the inner tube relative to a magnetic field produced by the coil.

24. A pressure regulating apparatus according to claim 18 further comprising a controller electrically connected with the pressure sensing element and configured to maintain fuel pressure within a prescribed range of pressures, and wherein the controller is selected from the group consisting of proportional controllers, derivative controllers, integral controllers, proportional-derivative controllers, proportional-integral controllers, and proportional-integral-derivative controllers.

* * * * *